United States Patent
Toyoda et al.

(10) Patent No.: US 6,690,482 B1
(45) Date of Patent: Feb. 10, 2004

(54) IMAGE FORMING METHOD AND AN IMAGE FORMING APPARATUS THEREFOR

(75) Inventors: Masanori Toyoda, Osaka (JP); Hiroshi Tanaka, Yamatokoriyama (JP); Toru Adachi, Yamatokoriyama (JP); Tokiyuki Okano, Yamatokoriyama (JP); Kenji Matsumoto, Kushikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/200,795

(22) Filed: Nov. 30, 1998

(30) Foreign Application Priority Data

Dec. 26, 1997 (JP) .............................................. 9-360313

(51) Int. Cl.$^7$ .............................................. G06F 15/00
(52) U.S. Cl. .................... 358/1.2; 358/450; 382/284; 382/294
(58) Field of Search ........................ 358/1.2, 1.5, 1.12, 358/1.13, 1.14, 1.15, 444, 450, 451; 382/284, 287, 294, 298

(56) References Cited

U.S. PATENT DOCUMENTS

| | | |
|---|---|---|
| 5,033,102 A | 7/1991 | Nakajima et al. |
| 5,140,647 A | 8/1992 | Ise et al. |
| 5,465,103 A | 11/1995 | Yoshioka |
| 5,465,163 A * | 11/1995 | Yoshihara et al. .......... 358/444 |
| 5,517,319 A | 5/1996 | Arai |
| 6,148,118 A * | 11/2000 | Murakami et al. .......... 358/450 |

FOREIGN PATENT DOCUMENTS

| | | |
|---|---|---|
| JP | 61265964 A | 11/1986 |
| JP | 7131631 A | 5/1995 |

* cited by examiner

Primary Examiner—Mark Wallerson
(74) Attorney, Agent, or Firm—Birch, Stewart, Kolasch & Birch, LLP

(57) ABSTRACT

The data of the partial images of an original output from an original input scanning device is converted by an image reducing section into reduced images of data in accordance with the size of duplication. Each reduced image of data is stored in a data storage. A pattern matching section compares adjoining reduced partial images of data as to the overlapping image data, to check the congruency therebetween. Based on this judgement result, an address setting section generates a joining position address corresponding to the joining position in each storage area. A data output control section loads the adjoining reduced partial images of data stored in respective storage areas, in a sequentially, joinable manner, so that an image forming section forms a duplicated image of the original on a predetermined recording medium in accordance with the reduced image data.

9 Claims, 12 Drawing Sheets

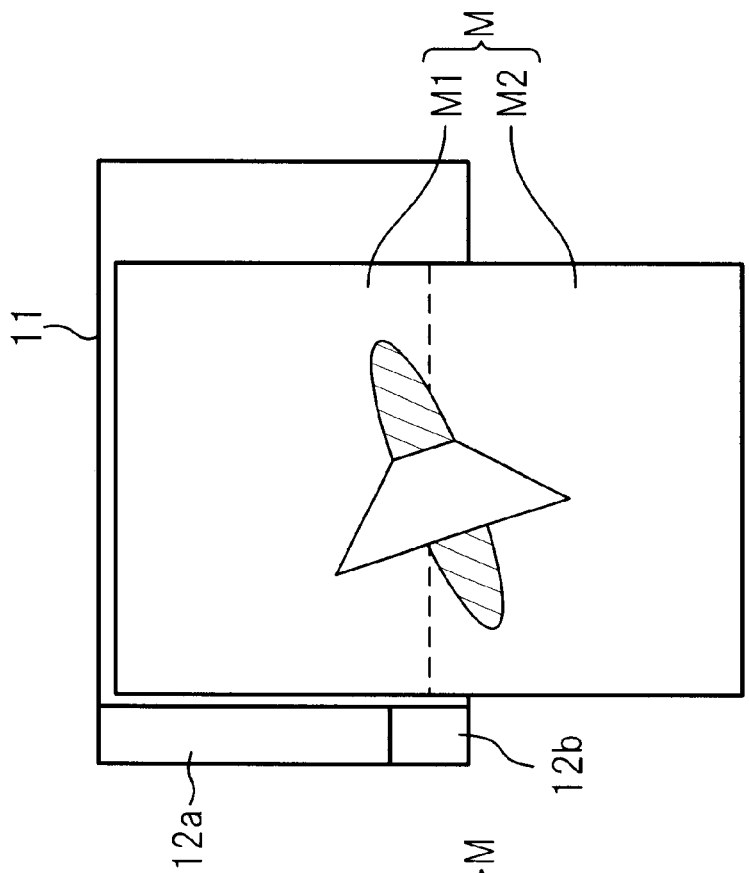
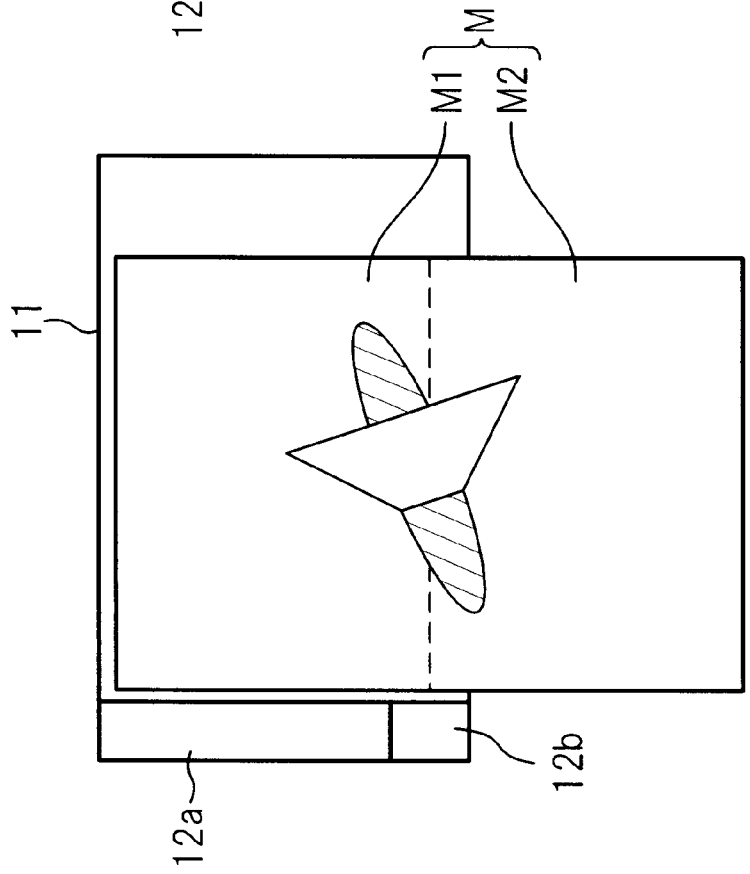

FIG.10A
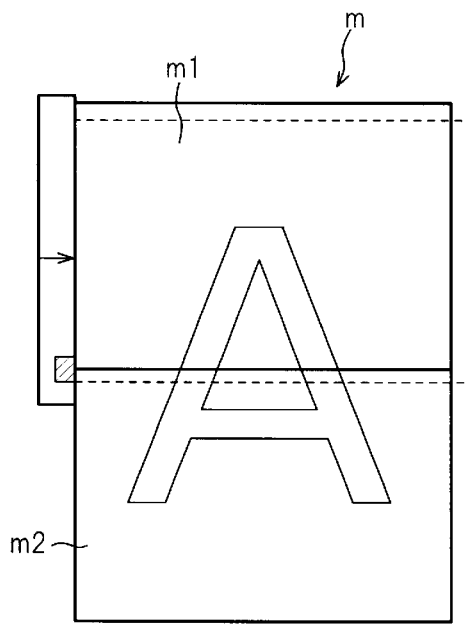
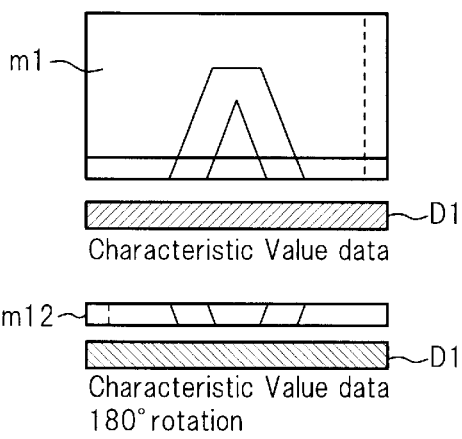
Characteristic Value data
Characteristic Value data
180° rotation
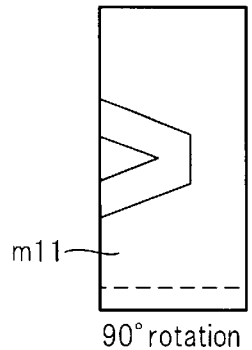
90° rotation
FIG.10B
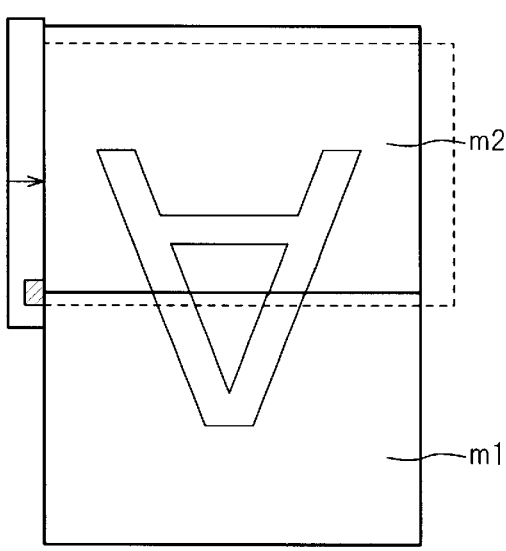
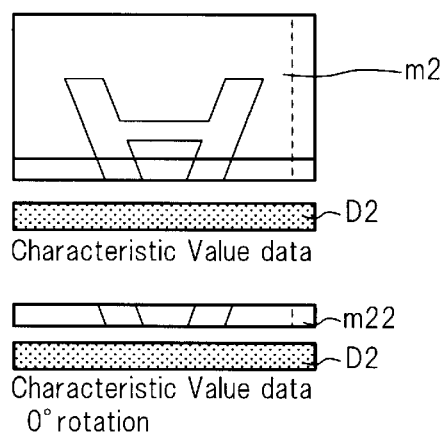
Characteristic Value data
Characteristic Value data
0° rotation
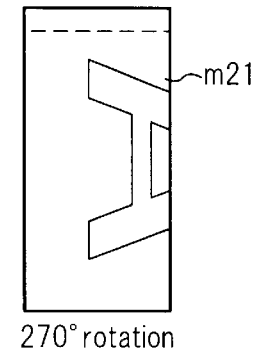
270° rotation FIG.13A
FIG.13B
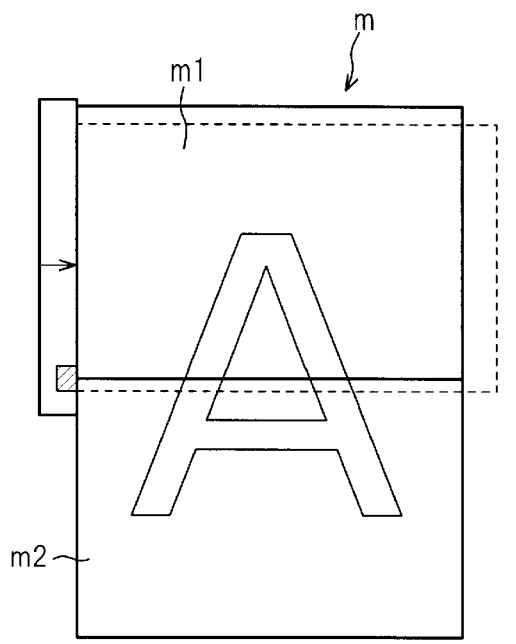
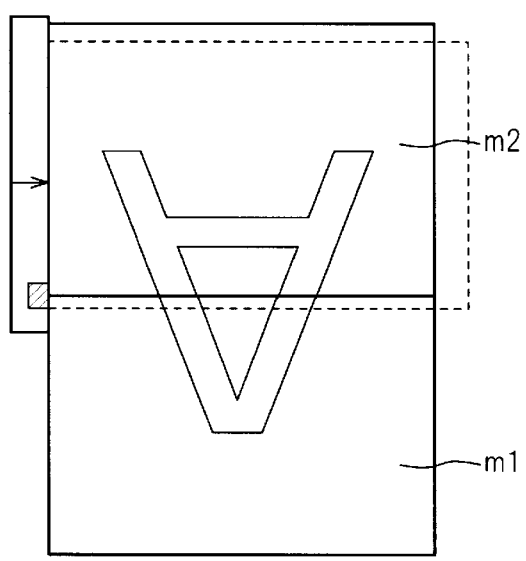
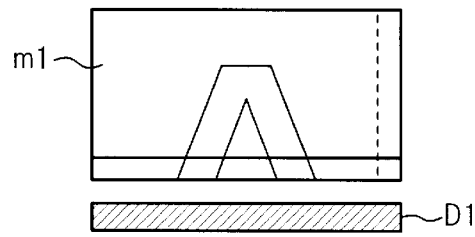
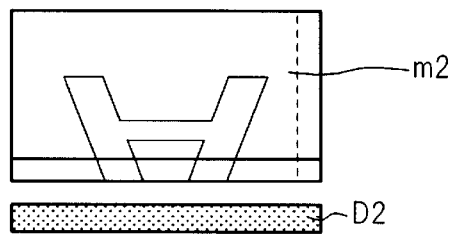
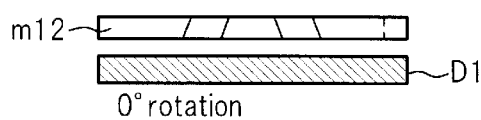
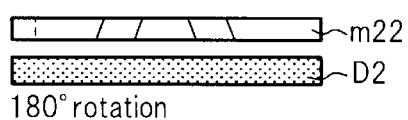
0° rotation
180° rotation
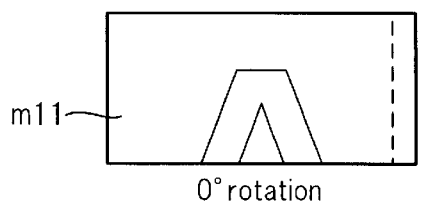
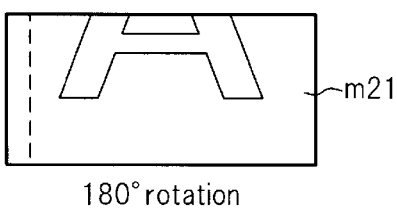
0° rotation
180° rotation

IMAGE FORMING METHOD AND AN IMAGE FORMING APPARATUS THEREFOR

BACKGROUND OF THE INVENTION (1) Field of the Invention

The present invention relates to an image forming method and an image forming apparatus therefor whereby an original is electronically read and the original image data can be processed by various editing functions to add effective representation to the original image. More detailedly, the present invention relates to an image forming apparatus having the function of reading a large-sized original, greater than the maximum original size the original table can handle, part by part, by multiple scans using a scanner or the like and reproducing the original image by joining the thus obtained sets of image data of the partial images of the original to be a single set of image data.

(2) Description of the Prior Art

Conventionally, as disclosed, for example, in Japanese Patent Application Laid-Open Hei 7 No. 131,631, image forming apparatuses such as digital copiers have been known which have an image editing function of reading an original greater in size than the maximum original to be set on the original table, part by part, by multiple scans and reproducing the original image by joining the thus captured partial images of the original as a single image.

In reading the original image in parts by multiple times, this image forming apparatus reads adjoining partial images in an overlapping manner, storing multiple partial images of data having common areas into the storage and then implementing pattern matching with respect to the overlapping areas, producing the original image data, composed of multiple partial images joined, in the memory, converting the image data into one having a size corresponding to that of the image to be reproduced, etc., and outputting the image on the designated recording medium through an image outputting means.

The conventional image forming apparatus having an image joining function, however, suffers from the following problems.

That is, the conventional configuration joins multiple sets of image data to once produce a bulky amount of original image data in the memory and stores it therein, so the storage device needs to have a large storage capacity, increasing the apparatus' cost.

For example, when the apparatus has an A3-sized original table and an A2-sized original needs to be copied, the original is divided in parts of A3 size and stored into the storage device. Therefore the storage device needs a storage capacity of A2 size. Further, pattern matching between the partial images, using the common areas thereof, needs a large amount of storage capacity and requires a extensively long processing time.

Moreover, for producing an image of A2 size after the matching process, a very long time is needed for connection processing.

Besides, when the placement of the original is skewed (angled), the area to be searched for matching increases. Resultantly, the time and storage capacity required for matching would increase. Further, the process needs so-called affine transformations such as image rotation, translation, enlargement/reduction, etc., requiring a very long time, making it impossible to meet a practical level of processing time.

Furthermore, when connection processes such as pattern matching etc., are implemented, it is necessary to capture common image areas from the partial images of an original as they are picked up by multiple scans, part by part. In such a case where a large-sized original needing pattern matching is read, when the original is set on the original table it is not easy to decide the reference point, based on which the original will be put with respect to the original table. So it was difficult to select and define the overlapped image used for pattern matching between the first partial image of the original to be read first and the second partial image of the original to be read next.

SUMMARY OF THE INVENTION

It is therefore an object of the present invention to provide an image forming method and an image forming apparatus, which can solve the above problems and whereby a large-sized original greater than the maximum size to be placed on the original table can be copied in a correct and simple manner with a low cost configuration.

In order to achieve the above object, the present invention is configured as follows:

In accordance with the first aspect of the present invention, an image forming method for duplicating an original image having a size greater than the maximum size to be placed on the original table, comprises the steps of:

dividing the original image into a multiple number of partial images having a size equal to or smaller than the maximum placement size;

scanning adjoining partial images in a partially overlapped manner to supply multiple sets of partial images of data;

converting the, supplied, multiple partial images of data into reduced, partial images of data by reduction at a desired ratio;

storing the converted, reduced partial images of data into multiple storage areas;

effecting pattern matching by comparing adjoining reduced partial images of data as to the overlapping image data;

setting a joining position address that corresponds to the joining position in each storage area of reduced image data, based on the result of the pattern matching;

outputting the multiple reduced images of data stored in the different storage areas in a sequentially joinable manner; and reproducing a reduced image of the original on the predetermined recording medium in accordance with the reduced partial images of data sequentially output in a joining manner.

In accordance with the second aspect of the present invention, an image forming apparatus for duplicating an original image having a size greater than the maximum size to be placed on the original, comprises:

an original image scanning means which successively scans a multiple number of partial images of an original, each divided to a size equal to or smaller than the maximum size of the original table, in a manner that produces at least an overlapping area between adjoining partial images, and supplies the multiple partial images of data;

an image reducing means converting the multiple partial images of data supplied from the original image scanning means into reduced partial images of data, reduced at a desired ratio;

a reduced partial image data storing means for storing each reduced partial image of data produced by the image reducing means;

a pattern matching means for implementing pattern matching based on the overlap image data between the adjoining, reduced partial images of data;

an address setting means for setting a joining position address that corresponds to the joining position in each storage area of reduced image data, based on the result obtained from the pattern matching means;

a data output control means which, based on the joining position addresses, outputs the multiple reduced partial images of data stored in respective storage areas, in a sequentially, joinable manner; and an image forming means for forming a reduced image of the original on a predetermined recording medium in accordance with the image data output from the data output control means.

In accordance with the third aspect of the present invention, an image forming apparatus for duplicating an original image having a size greater than the maximum size to be placed on the original table, comprises:

a reference plate disposed so as to extend in one direction over the original table and having a side edge which forms the datum for the placement of an original;

an original image scanning means for capturing the image of an original placed abutting against the side edge of the reference plate, part by part, by multiple scans, to produce and supplies multiple partial images of data containing an overlapping area between adjoining partial images;

a connection relationship determining means for determining the connection relationship between adjoining multiple partial images of data of the original, based on the image data of the original image, within the joining range which extends perpendicularly to the reference plate with a predetermined width;

a data output control means for joining the multiple partial images of data of the original to produce integrated image data of the original, based on the connection relationship determined by the connection relationship determining means; and an image forming means for forming an image of the original on a predetermined image medium, based on the image data output from the output control means, and is characterized in that the reference plate has a range mark displaying the joining area and a reference indicator within the range mark.

In accordance with the fourth aspect of the present invention,

The image forming apparatus having the above third feature is characterized in that the reference indicator is located at the center of the range mark with respect to the extended direction of the reference plate.

In accordance with the fifth aspect of the present invention, the image forming apparatus having the above second feature, further comprises an original pressing member for fixing the original onto the original table.

In accordance with the sixth aspect of the present invention, the image forming apparatus having the above third feature, further comprises an original pressing member for fixing the original onto the original table.

In accordance with the seventh aspect of the present invention, the image forming apparatus having the above fourth feature, further comprises an original pressing member for fixing the original onto the original table.

In accordance with the above configuration of the present invention, when, for example, an original is read as two partial images, by two scans (the $1^{st}$ and $2^{nd}$ scans) to obtain the image data, the apparatus, based on the result of pattern matching, generates joining position addresses, directly outputs the partial images of data, instead of producing a synthesized image in the memory, switching from one to the other in accordance with the joining position addresses, to thereby produce a reduced, duplication image by joining multiple reduced partial images of data.

Further, in accordance with the present invention, a pair of marks added at the opposing positions on both sides of the original or a fold of the original, can be set, on the original table, in alignment with the reference indicator provided within the range mark displaying the pattern matching area, so that it is possible to more reliably capture the image of the area required for joining the partial images of the original.

Moreover, when, in a configuration where the reference indicator is provided at the center of the range mark, the original is set so that a pair of marks added at the opposing positions on both sides of the original, or a fold of the original is in alignment with the reference indicator, it is possible to reliably capture the partial images whilst suppressing the area required for image joining to the minimum.

Finally, in all configurations of the present invention described above, when pressing members for fixing the original onto the original table are provided so as to prevent unintentional rotation or other movement of the original, it is possible to further efficiently effect the image forming operation in the image joining mode, without needing any correcting treatments required due to the rotation of the image.

BRIEF DESCRIPTION OF THE DRAWINGS

FIGS. 2A and 2B are plan views illustrating the placement states of an original on the platen of the digital copier in the above embodiment, specifically FIG. 2A shows the placement state at the first scan and FIG. 2B shows the placement state at the second scan;

FIGS. 10A and 10B are illustrative diagrams illustrating the states of reading an original when an A2-sized original image is reproduced in a joining manner as an image of A3 size in the second embodiment of the present invention, FIG. 10A shows the steps of reading the upper half of the original and FIG. 10B shows the steps of reading the lower half of the original.

FIGS. 13A and 13B are illustrative diagrams showing the states of reading an original when an A2-sized original image is reproduced in a joining manner as an image of A3 size in the second embodiment of the present invention, by considering the orientation of the joined, final image and the orientation of the paper, FIG. 13A shows the steps of reading the upper half of the original and FIG. 10B shows the steps of reading the lower half of the original.

DESCRIPTION OF THE PREFERRED EMBODIMENTS

The embodiments of the invention will hereinafter be described.

Referring first to FIGS. 1 through 6, the basic configuration and operation of the embodiment of the invention will be described.

In this embodiment, an image forming apparatus having an original table on which an A3-sized original can be placed will be explained as an example.

Figure 1:
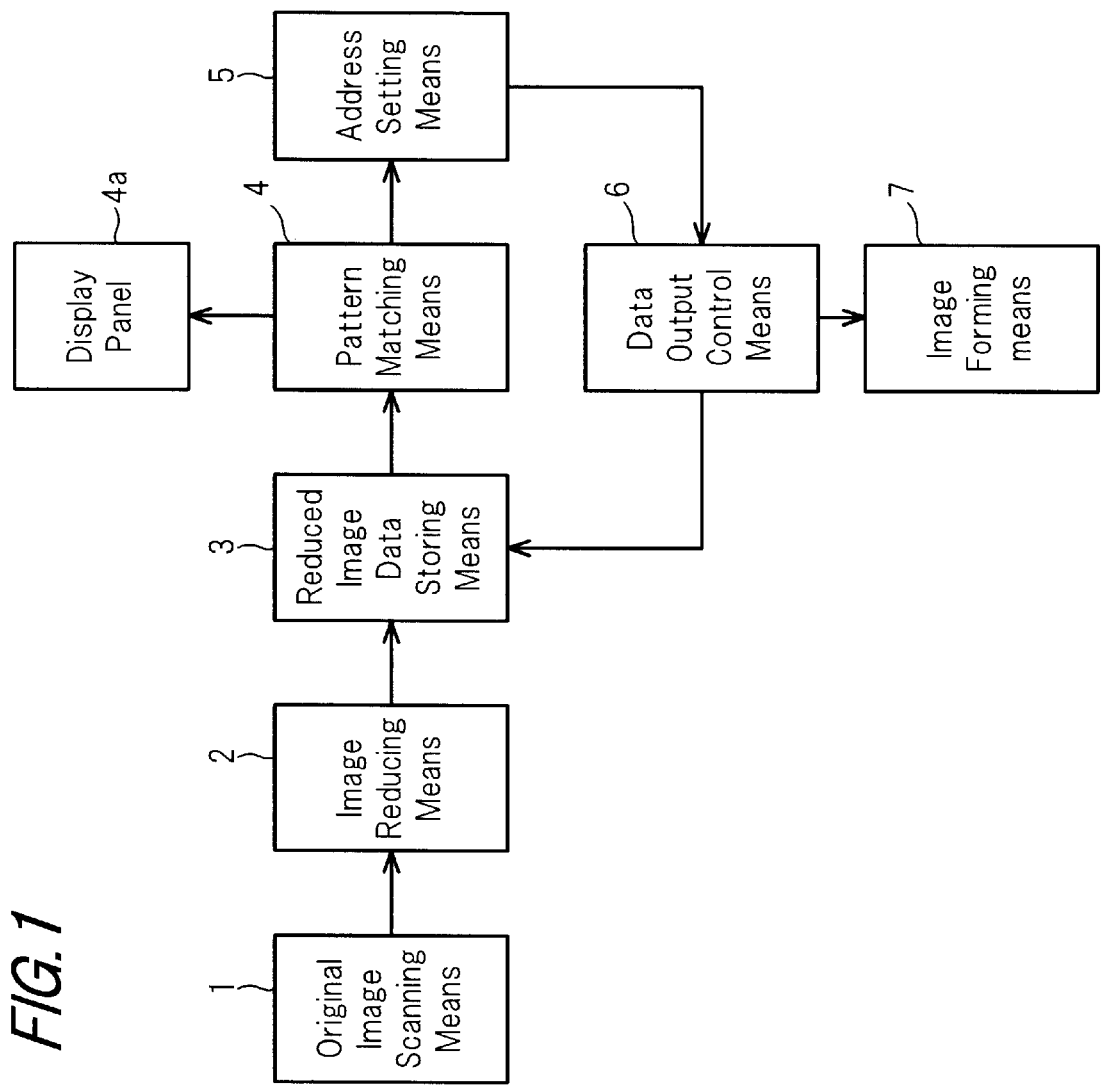
FIG. 1 is a schematic block diagram showing a digital copier in accordance with the embodiment of the present invention.
Figure 3:
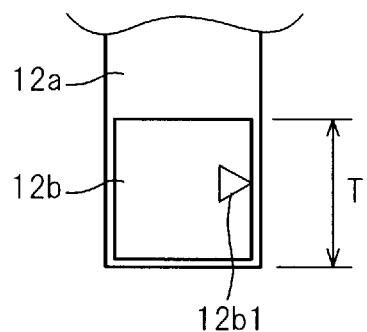
FIG. 3 is a partial plan view showing an original placement indicator within the original marker shown in FIGS. 2A and 2B.

As shown in FIG. 1, the copier of this embodiment includes an original image scanning means 1 for scanning the image of an original M placed on an original table 11 (see FIGS. 2A and 2B and FIG. 4) to acquire partial images of data; an image reducing means 2 converting partial images of data captured by original image scanning means 1 into reduced, partial images of data; a reduced partial image data storing means 3 having a plurality of storage areas for storing the reduced partial images of data obtained from image reducing means 2; a pattern matching means 4 for implementing pattern matching based on the overlap image data between the reduced partial images stored in the storage areas in reduced partial image data storing means 3; an address setting means 5 for setting the joining position address that corresponds to the joining position in each storage area of each reduced, partial image of data, based on the processing result obtained from pattern matching means 4; a data output control means 6 which, based on the joining position addresses and the like designated by address setting means 5, outputs the partial images of data from respective storage areas in reduced partial image data storing means 3 in a sequentially, joinable manner; and an image forming means 7 for forming an image on a recording medium such as a predetermined sheet of paper in accordance with the image data output from data output control means 6.

Figure 4:
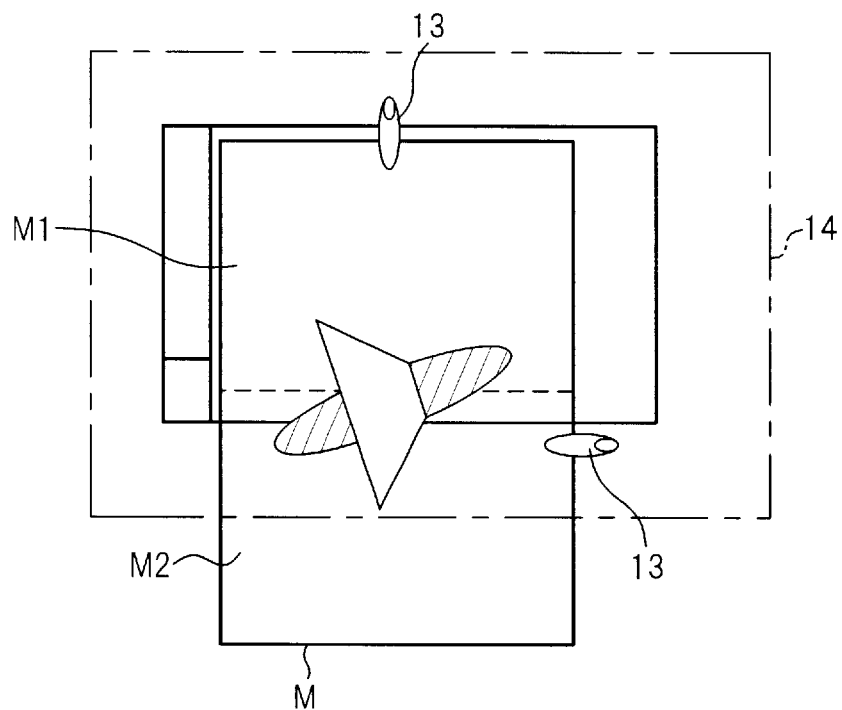
FIG. 4 is a plan view showing pressing members provided for the platen shown in FIGS. 2A and 2B.

As shown in FIGS. 2A, 2B, and 4, the copier in this embodiment has an original table 11 which supports an original M and scans the image thereof, at a maximum size of A3, and further has an original table cover 14 which is openable and closable with respect to this original table 11. This original table cover 14 is provided with pressing members 13 for holding and fixing the original M placed on original table 11. Here, two pressing members 13 are provided so that original M can be held and fixed at its edge along the main scan direction and at its edge along the auxiliary scan direction, but the number, shape, etc. will not be particularly limited and any configuration is applicable as long as original M can be fixed unrotatably.

Original table 12 has a reference plate 12a for limiting the position of original M with respect to the main scan direction and indicating the position with respect to the auxiliary scan direction. This reference plate 12a has a range mark 12b having a predetermined width T at its front end. This range mark 12b has a reference indicator 12b1 for designating a single line in the image (overlap image) set within original setting display 12b.

The aforementioned image outputting means is not illustrated but may be configured of a well-known device, including a laser output means for forming a static latent image on the photoreceptor with image-forming laser beams in accordance with the image data.

In FIG. 1, a reference numeral 4a designates a display means producing a display as appropriate in accordance with the processed result from the pattern matching means.

Figure 6:
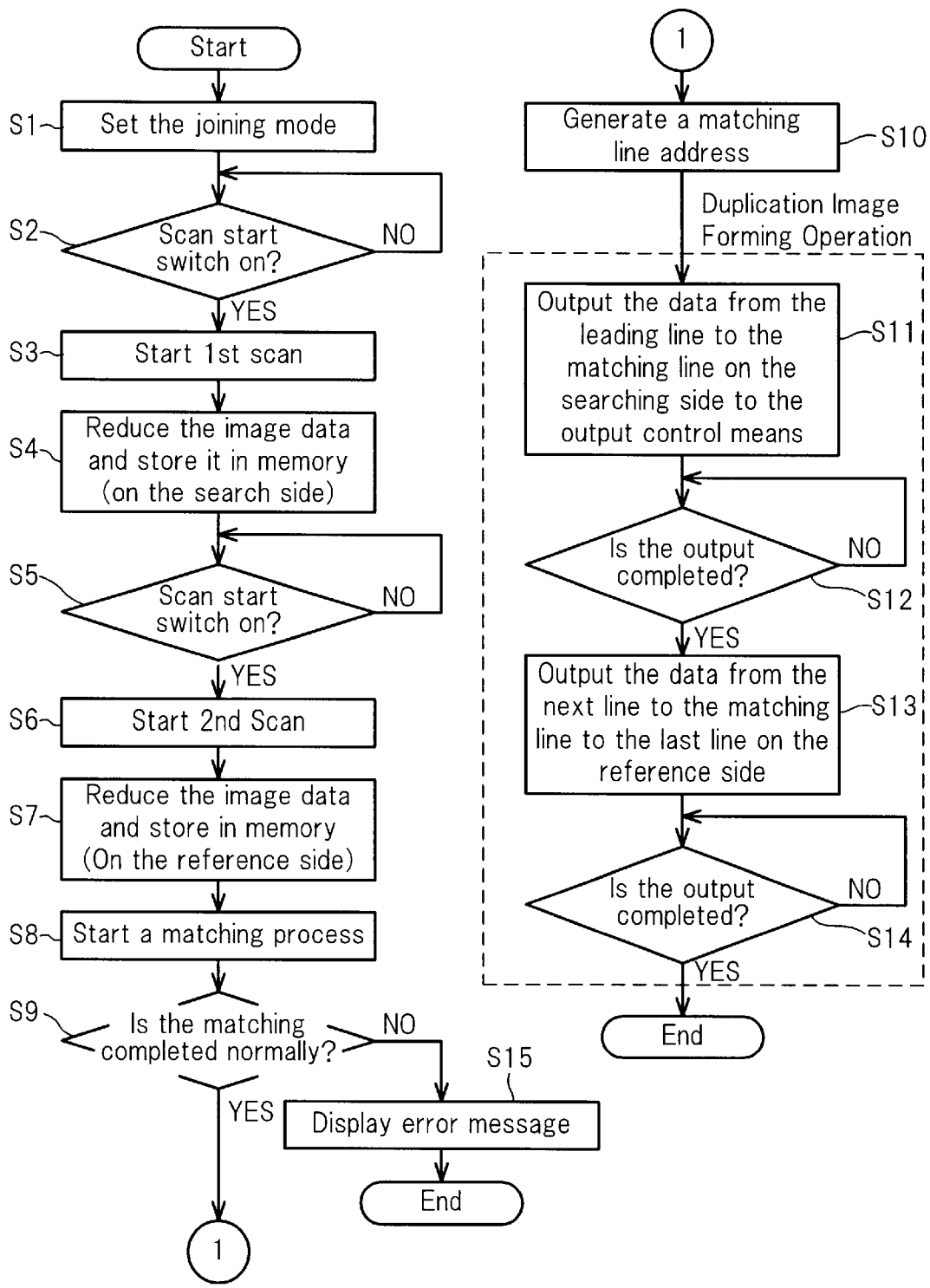
FIG. 6 is a flowchart for illustrating the operation of the digital copier shown in FIG. 1.

Referring next to the flowchart shown in FIG. 6, description will be made of the copying method, effected in the thus configured image forming apparatus, of copying an original M having a size greater than that of original table 11.

First, when an original M having a size greater than that of original table 11 is wanted to be copied by using original table 11, a joining mode is selected by an unillustrated mode selecting switch (Step S1), and then original M is set.

When an original greater than original table 11 is set, one side, with respect to the auxiliary scan direction, of the original is aligned with the side edge of reference plate 12a of original table 11 and then the position of original M is set with respect to the main scan direction. In this setting, the joining area of original M of greater than A3 size but not greater than A2 size needs to be placed within range mark 12b formed in reference plate 12a. For example, if original M is an A2-sized one, the center portion with respect to the longitudinal direction is assumed to be the joining area and is aligned with range mark 12b (see FIGS. 2A and 2B). Then, the thus positioned original M is held so that the part of the original (the first partial image) M1 residing over original table 11 is fixed at the two orthogonal sides by two pressing members 13, 13. This totally inhibits original M from being displaced in the rotational direction or any other direction.

After original M is thus set, an unillustrated switch is operated to input the start command of scanning. In accordance with this, original image scanning means 1 starts scanning the first partial image M1 of the original, placed over original table 11 (Steps S2 and S3). The image data of the first partial image M1 of the original, thus scanned is output from original image scanning means 1 and the partial image of data is converted by image reducing means 7 into reduced partial image of data in accordance with the copy size of the image to be reproduced (Step S4). This reduced partial image of data is stored in the first storage area in reduced image data storing means 3. In this way, the first original scan is completed and then the second original scan will be performed.

Before the second scan of the original, the operator releases pressing members 13 fixing the first partial image M1 set for the first original scan, turns the original by 180° and places the original by aligning the joining area with range mark 12b in the same manner as the first scan so that the second partial image M2 is located over original table 11 and again fixed by pressing members 13. Thereafter, an unillustrated switch is operated to input the start command of the second scan so as to scan the second partial image M2 of the inverted original M (Step S6). The thus obtained partial image signal by this scan is processed into reduced partial image of data via image reducing means 2, and the resultant data is stored into the second storage area of reduced partial image data storing means 3 (Step S7).

Figure 5:
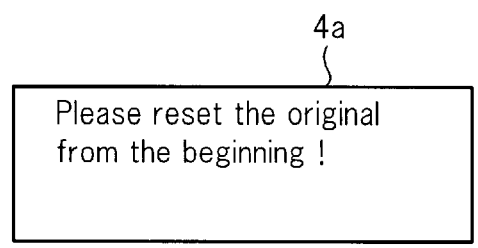
FIG. 5 is an illustrative plan view showing an example of warning message displayed on the display panel shown in FIG. 1.

The partial images of data captured by the first and second scans, are of reduced partial image of data, reduced to A4 size. Then, matching means 4 starts matching by using the image data representing the common area, from these two images of data stored in the first and second storage areas (Step S8). In this matching process, a single matching point is determined first and then a matching line is determined based on this matching point. Based on the thus obtained matching line, address setting means 5 sets a joining position address of the image data (reference image data) stored in the second storage area of reduced partial image data storing means 3 (Step S9 and S10). If the placement of the original is infelicitous so that a proper matching process cannot be done, for example, in a case where it is impossible to set up a matching line, display panel 4a displays a warning message, as shown in FIG. 5, indicating that the operator check the set position of the original and a series of procedures are stopped (Step S15).

On the other hand, when the address setting means has set a joining position address, data output control means 6 executes the image data generating operation through Steps S11 to S14.

Specifically, at Step S11, the partial image of data, captured by the first scan, from the leading line of the first partial image M1 to the matching line, is read out from the first storage area of reduced partial image data storing means 3 to be input to image forming means 7. The image forming means, based on the input data, reproduces the first partial image M1 on the paper as a recording medium.

Subsequently, the reduced partial image of data image (the second reduced partial image of data) captured by the second scan is loaded from the second storage area, from the joining position address determined by address setting means 5 to the final line, and this is input to image forming means 7. Image forming means 7 then outputs the second reduced partial image M2 onto the paper sequentially after the first reduced partial image M1, thus completing a duplication of the original image reduced to A3 size.

It should be noted that if the normal mode is selected instead of the joining mode by the mode selecting switch, an original M having a size within the maximum placement size for original table 11 can also be copied.

Further, in the above embodiment, since pressing members 13 for fixing original M over original table 11 are provided, it is possible to set up a matching line by determining a single matching point. However, in the case in which no pressing member is provided, two or more matching points may be searched and determined so as to set up a matching line based on the two matching points.

Concerning the original to be copied, the above description was made using an example of an original having size of A3 to A2, but an original M having a size exceeding A2 may be handled by the present invention. For example, when an original M having a length greater by some times than that of A2, the original M may and need to be scanned by repeatedly turning the original by 180°. Of course, it is necessary for the reduced data storage means to have memory areas greater than the number of times of scanning of the original.

As has been stated heretofore, in accordance with the above embodiment, an original M having a size greater than that of the original table is divided and the divided parts of the original are scanned with the adjoining parts overlapped. At the same time, the image data of the overlap between the partial image is converted into reduced partial image of data corresponding to the copy size, and this reduced partial image of data is used to implement pattern matching so as to accommodate composition of partial image M and form a duplication of the original. Accordingly, this configuration makes it possible to sharply reduce the storage capacity required for the storage means. Further, since this configuration does not need to compose partial images in the storage means but forms a composed image directly on the recording medium such as paper in accordance with the reduced partial images of data, it is possible to markedly reduce the processing time of image data as compared to the conventional configuration in which the partial images are synthesized first in the storage means and the synthesized image of data is read out. At the same time, this configuration does not need to have a recording means having a large capacity for image composition, thus making it possible to markedly reduce the apparatus' cost.

Further, since original pressing members 13 are provided for fixing the original over the original table so as to prevent the original from being rotated unintentionally, it is possible to effect pattern matching without performing any correction needed stemming from an erroneous rotation of the image and hence further reduce the processing time of image data.

Next, the second embodiment of the present invention will be explained with reference to FIGS. 7 through 14.

This embodiment is of a digital copying method and a copier which are embodied based on the above first embodiment. In particular, this embodiment is configured so as to provide a clear original positioning reference on the original table so that the original image, inclusive of the joining area, can be reliably scanned in parts by multiple scans during the scanning of an original in the basic image joining mode, whereby the original can be set, a multiple number of times, in a simple manner using the image of the joining area as the reference.

Figure 7:
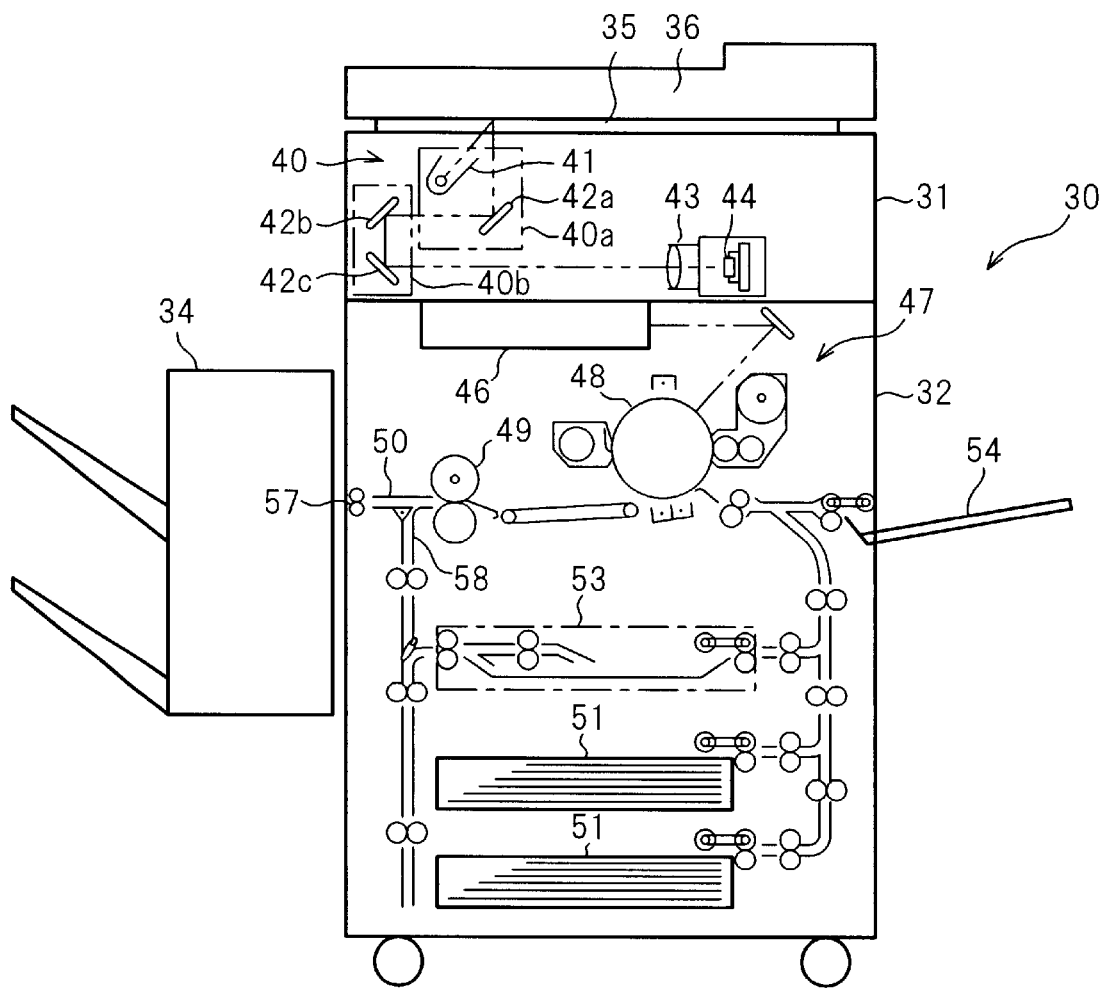
FIG. 7 is an illustrative side view showing the internal configuration of a digital copier in the second embodiment of the present invention.

Referring first to FIG. 7, the configuration of a digital copier 30 as the image forming apparatus of the second embodiment will be described.

Digital copier 30 is mainly composed of a scanner portion (original image scanning means) 31 and a laser recording portion (image forming means) 32.

Scanner portion 31 comprises: an original table 35 made up of transparent glass; a reversible automatic document feeder (RADF) 36 for automatically feeding originals to original table 35; and an original image scanning unit (to be referred to hereinbelow as scanner unit) 40 for scanning and reading the image of the original placed on original table 35.

The original image read by this scanner portion 31 is sent in an image data form to an aftermentioned image data input portion, where the image data is subjected to predetermined image processes.

RADF 36 is a document feeding device which has an unillustrated original tray having a plurality of originals stacked thereon so as to automatically feed the originals thus set, one by one, onto the original table over scanner unit 40.

In order to enable scanner unit 40 to read one side or both sides of the original in accordance with the operator's selection, RADF 36 further includes: a conveying path for one-sided originals, a conveying path for two-sided originals, conveying path selecting means, sensors for checking and controlling the state of the original passing therethrough; and a controller. Here a further detailed description will not be referred to since RADF 36 is well known.

Scanner unit 40 constituting scanner portion 31 for reading the image of the original on original table 35, includes: a lamp reflector assembly 41 for illuminating the original surface with light; a first scanning unit 40a having a first reflection mirror 42a for reflecting the reflected light from the original toward the photoelectric converting element (CCD); a second scanning unit 40b having second and third reflection mirrors 42b and 42c for leading the reflected light from first reflection mirror 42a to the photoelectric converting element (CCD); an optical lens 43 for focusing the light, reflected from the original and passing through the above reflection mirrors, onto the device (CCD) for converting the image into an electric image signal; and the aforementioned CCD 44 for converting the reflected light image from the original into an electric image signal.

Scanner portion 31 is configured so as to move scanner unit 40 along the underside of original table 35 to read the original image while original images are successively fed and discharged by the associated operation of RADF 36 and scanner unit 40. In particular, the first scanning unit 40a travels at a constant speed V from the left to the right along the original table while the second scanning unit 40b is adapted to travel in the same direction in parallel but at half the speed (V/2) of the speed V. In this configuration, the reflected light from the original placed on original table 35 is focused, by line, on CCD element 44 so that the image of the original will be read line by line.

The image data captured by reading the original image through scanner unit 40 is sent to an aftermentioned image processor where the data is subjected to various processes and then the data is temporarily stored into the memory in the image processor. In response to an output command, the image stored in the memory is read out and transferred to laser recording portion 32 so as to reproduce an image on the recording sheet.

This laser recording portion 32 comprises a sheet conveying system for conveying sheets as the recording media on which the image is formed, a laser writing unit 46 and an electrophotographic process unit 47 for image forming.

Laser writing unit 46 includes: a semiconductor laser source for emitting a laser beam in accordance with the image data retrieved from the memory or the image data transferred from an external unit subsequent to inputting scanning image data from the above-mentioned scanner unit 40; a polygon mirror for equiangularly deflecting the laser beam; and an f-θ lens for correcting the equi-angularly deflected laser beam so that the laser spot focused on a photoreceptor drum 48 as an element of electrophotographic processing unit 47 will move at the constant linear velocity across the drum.

The above electrophotographic process unit 47 includes, as is well known, a charger, a developing unit, a transfer device, a separator, a cleaning device and a charge erasing device, all being disposed around photoreceptor drum 48.

The sheet conveying system comprises: a conveying portion for conveying paper P to the electrophotographic processing unit for the above-described image formation, in particular to the transfer station where the transfer device is located; paper feed cassettes 51 and 52 for delivering paper P toward the conveying portion; a manual paper feeder 54 for feeding a sheet of paper having a required size as appropriate; a fixing unit 49 for fixing the image, i.e., the toner image, formed on the paper P after the transfer station,; and a re-feeding path 53 for re-feeding the paper P after fixing so as to enable an image to be formed on the rear side thereof.

Provided on the downstream side of fixing unit 49 is a post-processing apparatus 34 which receives paper P with an image recorded thereon and subjects this paper P to predetermined processes.

In laser writing unit 46 and electrophotographic process unit 47, laser writing unit 46 irradiates photoreceptor drum 48 with its laser beam in accordance with the image data read out from the image memory so as to form a static latent image over the surface of photoreceptor drum 48. The thus formed static latent image is visualized with the toner, then the toner image is electrostatically transferred to the paper fed from any of the multiple paper feeder units 51 or 52, and then fixed thereon through fixing unit 49.

The paper with an image thus formed thereon is conveyed from fixing unit 49 into post processing unit 34.

Digital Copier Control Block

Figure 8:
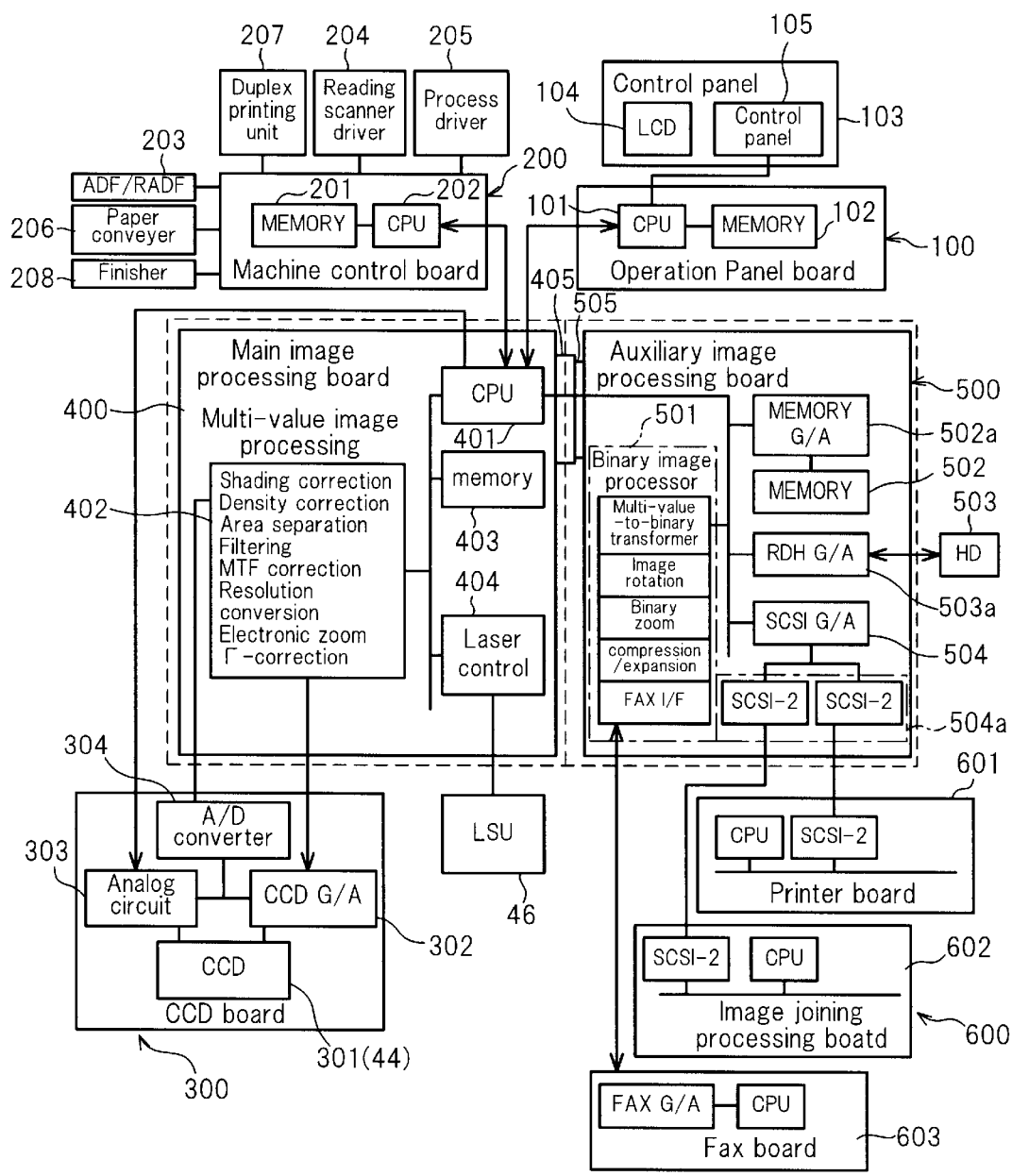
FIG. 8 is a block diagram showing a control system circuit of the digital copier shown in FIG. 7.

FIG. 8 is an overall block diagram showing the control system circuit for controlling various units constituting the digital copier 30 shown in FIG. 7 and the image processing portion. The control system circuit shown here is configured so that a main central processing unit 401 (CPU) controls the operation of each unit shown in FIG. 7 in cooperation with the auxiliary central processing unit (CPU) built into each unit.

As illustrated, the control system circuit in this embodiment comprises: an operation panel board 100 for management and control of a control panel 103; a machine control board 200 for management and control of the aforementioned units constituting digital copier 30; a CCD board 300 for electrically reading the original image and converting it into electronic data; a main image processing board 400 for subjecting the original image data electronically transformed through CCD board 300 to a predetermined image processes; an auxiliary image processing board 500 for subjecting the image data processed through main image processing board 400 to further predetermined image processes; and extension boards 600 (printer board 601, fax board 603, image joining processing board 602) connected through the interface to auxiliary image processing board 500.

Now, the control operation implemented by each board will be explained.

Operation Panel Board

Operation panel board 100 is basically controlled by auxiliary central processing unit (CPU) 101 and manages the display frame of an LCD display 104 provided on control panel 103, and control input through operation keys 105 for inputting instructions concerning diverse modes and the like.

A memory 102 is provided to store various pieces of control information from the control panel, such as data input through operation keys 105, the information to be displayed on the LCD screen.

In this configuration, auxiliary central processing unit (CPU) 101 exchanges control data with main central processing unit (CPU) 401 to direct the operation of digital copier 30.

Main central processing unit 401 sends a control signal representing the operation status of digital copier 30 to central processing unit (CPU) 101, so as to drive LCD display portion 104 of control panel 103 to inform the operator of the present status of the digital copier.

Machine Control Board

Machine control board 200 is controlled as a whole by auxiliary central processing unit 202 and manages an automatic document feeder 203 such as ADF, RADF or the like, a scanner driver 204 for driving scanner portion 31 which reads the original image, a process driver 205 for driving electrophotographic process portion 47 for reproducing the image from the image data, a paper conveyer 206 for successively conveying the paper on which an image is recorded, from the paper storage toward electrophotographic process portion 47, a duplex printing unit 207 for inverting the paper with an image recorded thereon so that images can be formed on both sides, a post-processing driver 208 for a post-processing unit 34 for performing post-printing tasks such as stapling of printed sheets with images, and the like.

CCD Board

CCD board 300 comprises: a CCD 301 for electrically reading the original image; a CCD gate array (CCD G/A) 302 for driving CCD 301; an analog circuit 303 for performing gain control of the analog data output from CCD 301; an A/D converter 304 for outputting electronic data, that is, for converting the analog output from CCD 301 into the digital signal, and the like. The control and management of the CCD board is performed by main central processing unit 401.

Main Image Processing Board

Main image processing board 400 is controlled by main central processing unit 401, so as to reproduce an image with desired graduations based on the electronic data of the original image sent from CCD board 300. For this purpose, the main image processing board comprises: a multi-value image processor 402 for directly processing the multi-valued image data, including shading correction, density correction, area separation, filtering, MTF correction, resolution conversion, electronic zooming (magnification transformation), gamma correction and the like; a memory 403 for storing the processed image data and control information including the sequence control program of the processing; and a laser controller 404 for outputting laser driving data to laser writing unit 46 in order to reproduce the image based on the processed image information.

Auxiliary Image Processing Board

Auxiliary image processing board 500 is connected to main image processing board 400 via connectors 405 and 505 and is adapted to be controlled by main central processing unit 401 on main image processing board 400. This auxiliary image processing board comprises: a binary image processor 501; a memory 502 for storing the, image processed, binary image information and the processing control information; a memory gate array (memory G/A) 502a for controlling memory 502; a hard disc (storage means) 503, which stores and manages plural pages of original image data and from which plural pages of original images can be repeatedly loaded a desired number of times so as to produce multiple copies; a RDH gate array (RDH G/A) 503a for controlling hard disc 503; and a SCSI 504a as the external interface; and a SCSI gate array 504 for controlling SCSI 504a.

The aforementioned binary image processor 501 comprises: a processor for converting multi-valued image data into binary image; a processor for rotating the image; a binary zooming processor for zooming the binary image data; a processor for compressing or expanding the image data; and the like. Processor 501 also includes a fax interface (FAX I/F) so as to receive and transmit a fax image via commutation means.

Extension boards

Extension boards 600 include: a printer board 601 which receives the data sent from a personal computer or the like and outputs the print mode data for laser recording portion 32 of digital copier 30; a functional extension board (connection relationship determining means) 602 for adding editing functions such as the image joining process, etc., of the digital copier for enabling efficient use of the features of the digital copier; a facsimile board 603 which enables transmission of the original image captured through the scanner of the digital copier to a remote site and also enables output of image data transmitted from a remote site by way of laser recording portion 32 of the digital copier. These extension boards 600, in cooperation with the auxiliary image processing board 500 and main image processing board 400, constitutes the data output control means.

Now, the processing of image data and the flow of the image data in the image processor of the digital copier will be described in further detail for each of the copy, facsimile and print modes.

Copy Mode

The originals set at the predetermined position of RADF 36 of digital copier 30 are successively fed, sheet by sheet, onto original table 35 of scanner unit 40. Then the images of the originals are sequentially read by the above described configuration of scanner unit 40 so that scanned 8 bit electronic data is transferred to main image processing board 400.

The 8 bit electronic data thus transferred to main image processing board 400 is subjected as 8 bit electronic image data to the predetermined processes on multi-value image processor 402.

Then, the 8 bit electronic image data is subjected to gamma correction and/or other processes and then the output is transferred to laser writing unit (LSU) 46 via laser controller 404.

In this way, the original image captured by scanner 31 of digital copier 30 is output from laser recording portion 32 as a copy image with gradations.

Electronic RDH Function in Copy Mode

Similarly, as originals set at the predetermined position in RADF 36 of digital copier 30 are successively fed, sheet by sheet, onto original table 35 of scanner unit 40, the images of the originals are sequentially read by the above described configuration of scanner unit 40 so that scanned 8 bit electronic data is transferred to main image processing board 400.

The 8 bit electronic data thus transferred to main image processing board 400 is subjected as 8 bit electronic image data to the predetermined processes on multi-value image processor 402.

Then, the 8 bit electronic image data is sent through connector 405 on main image processing board 400 and through connector 505 on auxiliary image processing board 500, to auxiliary image processing board 500 in which multi-value-to-binary value converter of binary image processor 501 effects error diffusion and the like while converting the 8 bit electronic image data into 2 bit electronic image data.

Here, the reason the 8 bit electronic image data is converted into 2 bit electronic image data whilst being subjected to error diffusion and the like, is to reduce the degradation of the image quality since a simple multi-value-to-binary conversion produces problems with the image quality.

The reason the 8 bit electronic image data is converted into 2 bit electronic image data is because of the consideration of image storage capacity and the like.

The thus converted 2 bit electronic image data is transferred to disc memory 503 such as a hard disc, keeping every original as one unit, and temporarily stored therein.

When all the stack of originals set on RADF 36 of digital copier 30 have been scanned, 2 bit electronic image data previously stored temporarily in hard disc 503, is loaded repeatedly the number of times necessarily corresponding to the designated number of prints by the control of the gate array. The thus retrieved 2 bit electronic image data is transferred, again via connectors 405 and 505, to main image processing board 400, where the data is subjected to gamma correction and other processes, and is in turn is sent to laser writing unit 46 via laser controller 404.

Although the above description was made with reference to an example where all the images of a stack of originals have been scanned and thereafter all the images are repeatedly loaded by the number of times corresponding to the number of copies, it is also possible to provide a configuration in which the output is performed one after another as soon as the first image has been prepared.

In this way, the original image captured by scanner 31 of digital copier 30 is output from laser recording portion 32 as a copy image with gradations.

Printer Mode

Image data sent from an external device connected to a network of personal computers is developed on printer board 601 as image data in page units, then is temporarily transferred to auxiliary image processing board 500 via the interface, i.e., SCSI gate array 504 so as to be stored into the memory such as hard disc 503.

The image developed on printer board 601 as page image data is sent to auxiliary image processing board 500. Upon this data transfer, the page image data is simply stored into hard disc 503 in a temporal manner, without being subjected to binary image processing.

When the page image temporarily stored is loaded from hard disc 503, no binary image processing will be effected for the page image.

While the image information temporarily stored in hard disc 503 is sequentially loaded from hard disc 503 in the predetermined page order, the data is transferred to main image processing board 400, where it is subjected to gamma correction. Then, based on the thus obtained data, laser controller 404 controls LSU 46 so as to reproduce an image.

Fax Mode

The fax mode includes: transmission of original images to a remote site and reception of original images from a remote site.

First, transmission of original images to a remote site will be described. The original documents to be transmitted, are set at the predetermined position of RADF 36 of digital copier 30, and are successively fed sheet by sheet onto original table 35 for scanner unit 40. Then the images of the originals to be transmitted are sequentially read by the above described configuration of scanner unit 40 so that scanned 8 bit electronic data is transferred to main image processing board 400.

The 8 bit electronic data thus transferred to main image processing board 400 is subjected, as 8 bit electronic image data, to the predetermined processes on multi-value image processor 402.

Then, the 8 bit electronic image data is sent through connector 405 on main image processing board 400 and through connector 505 on auxiliary image processing board 500, to auxiliary image processing board 500 in which multi-value-to-binary value converter of binary image processor 501 effects error diffusion and the like while converting the 8 bit electronic image data into 2 bit electronic image data.

Here, the reason the 8 bit electronic image data is converted into 2 bit electronic image data whilst being subjected to error diffusion and other processes, is to reduce the degradation of the image quality since a simple multi-value-to-binary conversion produces problems with the image quality.

Thus, the binarized image data of the originals to be transmitted is compressed in a predetermined format and stored in memory 502.

When a data transmission state has been established by executing the predetermined data transmission procedure with a remote site, the original images to be transmitted, which have been compressed in the predetermined format and loaded from memory 502, are transferred to facsimile board 603, where necessary treatments such as modification of the compression format, etc. are effected. Then the thus processed data is sequentially transmitted to the remote site via the commutation line.

Next, the process of the original image transmitted from a remote site will be described.

When an original image is transmitted from a remote site via the communication line, the apparatus executes the predetermined commutation procedure through facsimile board 603 and receives the original image data transmitted from the remote site. In parallel with this, the received image data which has been compressed in a predetermined format is transferred, via fax interface provided in binary image processor 501 of auxiliary image processing board 500, to binary image processor 501 where the transmitted original image data as page image data is reproduced by means of the compression/expansion processor etc.

The original image data represented in page units is transferred to main image processing board 400, where it is subjected to gamma correction. Then, based on the thus obtained data, laser controller 404 controls the image writing of LSU 46 so as to reproduce an image.

As apparent from the above configuration, the image processing portion effecting predetermined processes on the image information is mainly composed of: a main image processing board 400 for shaping the original image captured by scanner 31 into multi-valued image information; and an auxiliary image processing board 500 which will subject the original image information, which has been shaped in the multi-valued image information through main image processing board 400, to the predetermined processes such as the binarizing process, and which will subject the image information, transferred from a device connected thereto via the external interface, to the predetermined processes, and then transfer the processed data to the multi-value image processor (main image processing board 400) side.

In order to control laser writing unit 46 so as to reproduce an image from the image information onto an electrophotographic photoreceptor 48, main image processing board 400 has laser controller 404 for controlling the image data writing of laser writing unit 46.

With this arrangement, the original image input through scanner 31 can be reproduced as a duplicated image by means of laser recording portion 32, without losing the features of the original image as a multi-valued image. Further, when a large amount of originals need to be processed with high-speed using an electronic RDH function or the like, this can be handled by using auxiliary image processing board 500, hard disc 503 and other means.

Further, the apparatus is adapted to effect appropriate processing of image information in conformity with the digital functional features provided as part of digital copier 30. More specifically, the apparatus has facsimile and printing functions capable of handling the image information from an external device and output it, and especially for the facsimile function, the apparatus is able to, for example, binarize the multi-valued image (retaining the features of the original image) of an original to be transmitted.

Further, by diversifying the image processing portion into sections, it is possible to add variety to the variations (lineup) of digital copier 30, thus setting up a digital copier in accordance with the user's demand. Further, this configuration enables a systematic development of a copier after its installation, in accordance with the user's demand.

In the above configuration, since central processing unit (CPU) 401 disposed on main image processing board 400 also manages and controls auxiliary image processing board 500, it is possible to control the total flow of an image to be processed sequentially through the processing sections, and hence it is possible to smoothly handle the data and its processing flow, without losing any image data.

Next, an image joining function, which can be upgraded by adding an extension board for extended functions to the digital copier 30, will be described.

Image Joining Mode

Figure 9A:
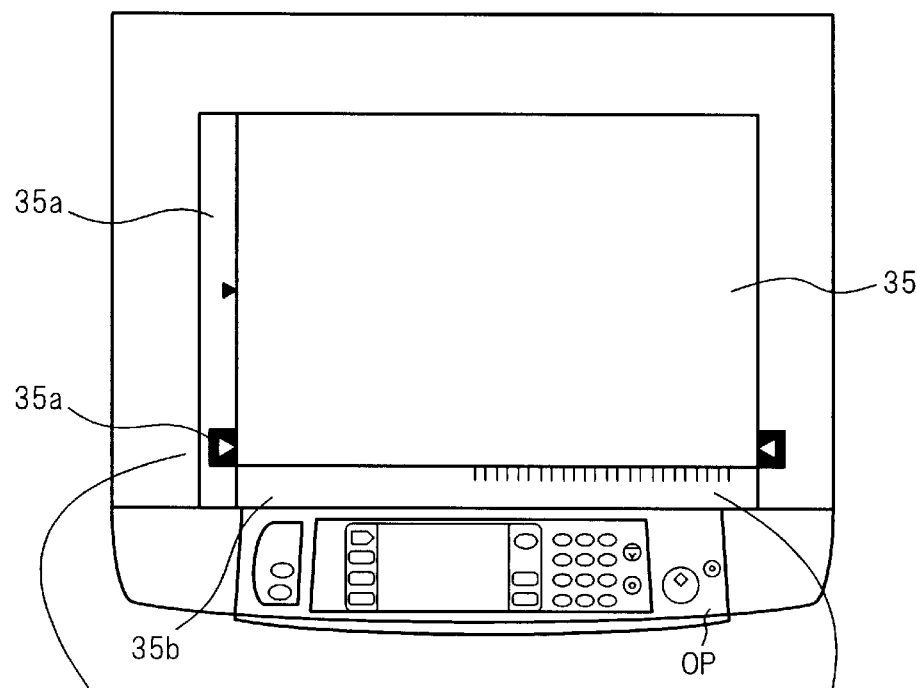
FIG. 9A is a plan view showing the original table and its peripheral configurations in the second embodiment of the present invention.
Figure 9B:
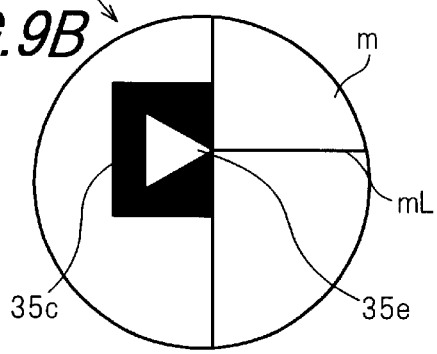
FIG. 9B is an enlarged view of the X-part in FIG. 9A
Figure 9C:
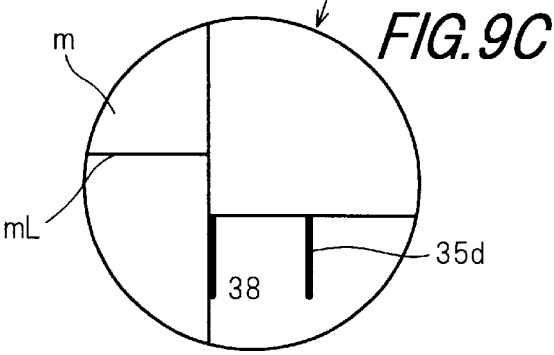
FIG. 9C is an enlarged view of the Y-part in FIG. 9A.

Referring first to FIGS. 9A–9C, description will be made of original table 35, which is made up of a transparent glass plate on which an original is placed, and its periphery.

The scanning start reference position of original scanner unit 40 in the original scanner 31 is at the left-side edge of the original table 35, and original scanner unit 40 is driven to move toward the right in parallel along the undersurface of original table 35, keeping a constant distance therefrom.

Arranged on the left-side edge of original table 35 is an original reference positioning plate (to be referred to as a reference plate) 35a for positioning one side of the original to be scanned. Provided on the control panel OP side is an original size scale plate 35b which extends in the auxiliary original scan direction.

A range mark 35c that shows the matching image area, i.e., the image area to be used for the joining process in the original image joining mode is marked at a position in proximity to the control panel OP side of original reference positioning plate 35a. Original size scale plate 35b is also marked with scales 35d making clear the size of the original, with respect to the main scan direction of the original, set on original table 35.

Range mark 35c and each scale 35d are also arranged in a visually manipulative manner arranged so as to make their display clear.

Illustratively, range mark 35c marked in reference plate 35a makes distinct the original placement range (joining range) to enable acquisition of image data to be used for a joining operation and has a reference indicator 35e to show the center of this range.

Referring next to a block diagram of a control circuit shown in FIG. 8, the operation flow of the image processing in the image joining mode will be described.

Multiple partial images captured by original scanner portion 31 are subjected to normal multi-valued image processes on main image processing board 400, then the resultant data is transferred in the form of multi-valued image data to auxiliary image processing board 500.

The multiple partial images represented in binary, which have been transformed from the multi-valued image data on auxiliary image processing board 500, are temporarily stored into memory 502 for later use.

Then only the image data from the image area placed in the joining range is extracted from each of the multiple partial images so that only the data of the joining range images thus extracted is transferred to image joining processing board 602, which is connected as a functional extension board. In this board, pattern matching is performed based on the joining range images, thus determining a matching image in the joining range.

Subsequently, the multiple partial images temporarily stored in memory 502 or hard disc 503 are connected with one another, using the determined matching image in the joining range, so as to produce a single integrated image from image output portion 32.

The image extraction, image matching, image joining in the image joining mode can be performed by the image processing operation which will be described in detail later.

Now, concerning the image joining mode, the method of setting an original to be scanned in the original scanning portion 31 of distal copier 30, and the processing operation for joining input, original partial images will be described.

FIGS. 10A and 10B illustrate the state of an original m which is greater than the size of the original table 35 and placed over original table 35 of digital copier 30, and the operational steps of storing the captured original image data as partial images of data to be joined.

Concerning FIGS. 10A and 10B, FIGS. 10A and 10B show the procedural flow of separately reading the upper half partial image (the first partial image) m1 of the original set on original table 35, and the lower half partial image (the second partial image) m2 of the original and the operation of preparation for the image joining process for multiple partial images m1 and m2 of data.

Initially, the first partial image m1 of original m is scanned by scanner 31 of digital copier 30.

As has been already described, since range mark 35c indicating the joining range for the joining process is provided in proximity to the control panel OP side on reference plate 35a provided on the reference side of original table 35, the original is set so that the area to be joined of the first partial image m1 resides within the range of this range mark 35c.

The data from the first partial image m1 of original m, scanned and captured by scanner 31 is handled as multi-valued image data on main image processing board 400 and subjected to the predetermined processes. Resultantly, the data is shaped into a 70% reduced, multi-valued image of data so that an A2 original may be handled as an A3 image.

At first, from this multi-valued image of data reduced to 70%, the multi-valued data of the image section residing at range mark 35c (the first matching image to be joined, designated at m12) is used to produce reference data D1 for pattern matching. Then, the 70% reduced, multi-valued image of data undergoes multi-value-to-binary value conversion on auxiliary image processing board 500, and thereafter the resultant data is separated into the first image to be joined m11 and the first matching image to be joined m12.

Then, the data of the first image to be joined m11 is turned 90° while the data of the first matching image to be joined m12 and reference data D1 for matching are turned 180°.

The prepared data of the first image to be joined m11, the first matching image to be joined m12 and reference data D1 are temporarily stored for later use into memory 502 capable of temporary storage.

Next, the original is turned 180° or placed upside down, and the second partial image m2 of original m is read by image scanner portion 31 of digital copier 30.

Similar to the aforementioned case where the first partial image m1 of original m is scanned and captured, the original is set so that the area to be joined of the second partial image m2 resides within the range of this range mark 35c, which is provided in proximity to the control panel OP side on reference plate 35a provided on the reference side of original table 35, indicating the joining range for the joining process.

Then the data from the second partial image, scanned and captured by scanner 31 is handled as multi-valued data on main image processing board 400 and subjected to the predetermined processes. Resultantly, the data is shaped into 70% reduced, multi-valued image of data so that an A2 original may be handled as an A3 image.

From this multi-valued image of data reduced to 70%, the multi-valued data of the image section residing at range mark 35c (the second matching image to be joined, designated at m22) is used to produce reference data D2 for pattern matching. Then, the 70% reduced multi-valued image of data undergoes multi-value-to-binary value conversion on auxiliary image processing board 500, and thereafter the resultant data is separated into the second image to be joined m21 and the second matching image to be joined m22.

Then, the data of the second image to be joined m21 is turned 270°.

The prepared data of the second image to be joined m21, the second matching image to be joined m22 and reference data D2 are temporarily stored for later use into memory 502 capable of temporary storage.

In this case, it is very difficult to position the portion placed within range mark 35c when the first partial image m1 was scanned, in a totally corresponding manner within range mark 35c to that when the second partial image m2 is set.

To deal with this, the original to be the target of the joining process may be folded in two, or a pair of marks may be added at the opposing positions in both sides of the original, so that the fold or the marks can be set at the reference indicator 35e provided in the middle of joining range mark 35c, marked on original reference positioning plate 35a in proximity to the control panel OP side. Thus it is possible to correctly set and scan both the first and second partial images m1 and m2 of original m, with an improved matching precision, thus producing an exactly joined image and improving the processing speed of the joining process.

Figure 11:
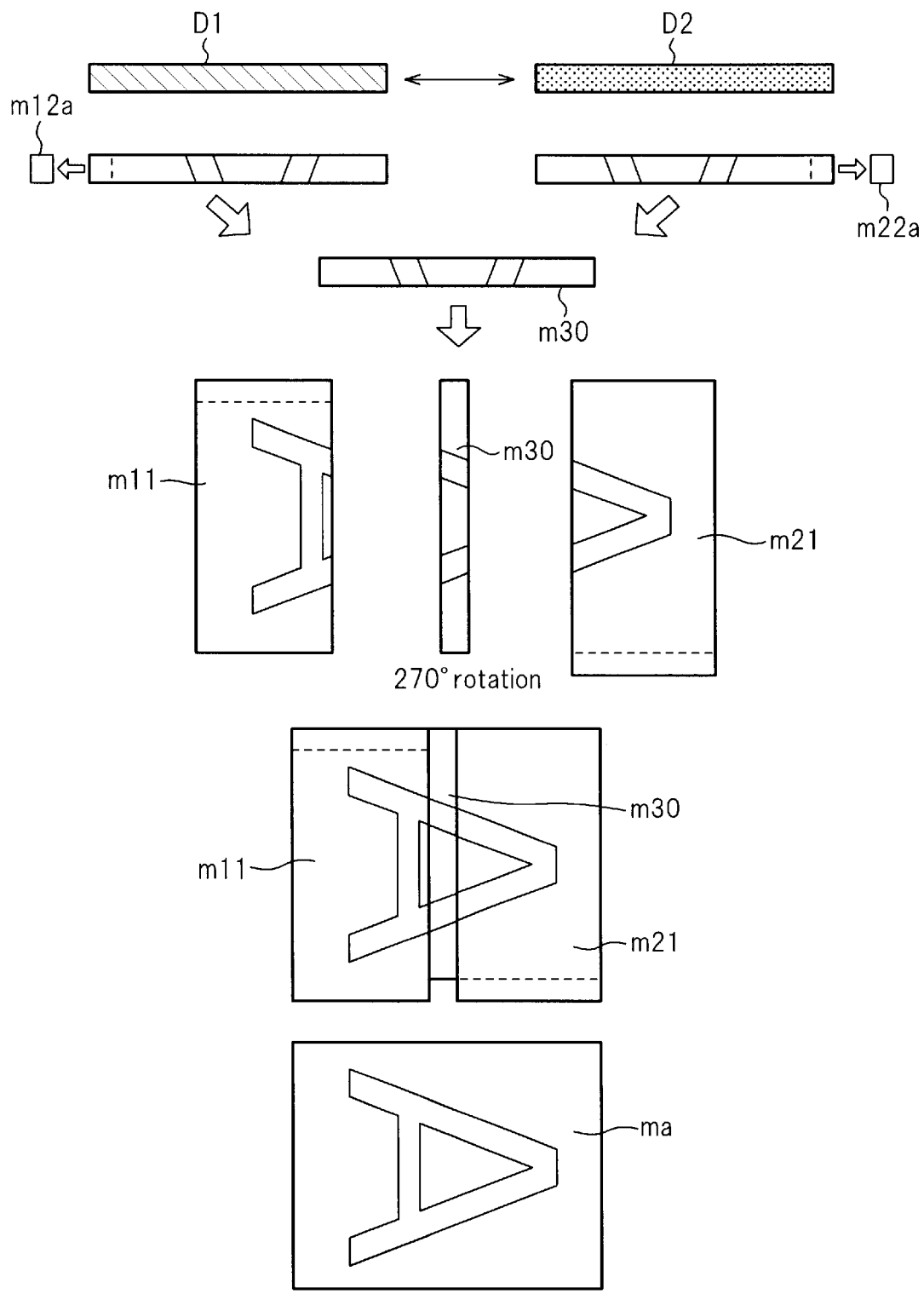
FIG. 11 is an illustrative view showing the steps of reproducing an A3 sized image by joining, from an A2-sized original image in accordance with the second embodiment of the present invention.

Referring next to FIG. 11, explanation will be made of the pattern matching process between the data of the first matching image to be joined m12 and the data of the second matching image to be joined m22, both being stored in memory 502, and the joining process of the data of the first image to be joined m11 with the data of the second image to be joined m21 based on the matching processed, image data.

First, the data of the first matching image to be joined m12 with reference data D1 as well as the data of the second matching image to be joined m22 with reference data D2, all prepared on auxiliary image processing board 500 and temporarily stored in memory 502, is transferred to image joining processing board 602.

Then, on image joining processing board 602, the unnecessary rear end parts m12a and m22a, which were captured when each partial image was placed on original table 35 are removed based on the original width information, respectively from the data of first matching image to be joined m12 with reference data D1 and from the data of second matching image to be joined m22 with reference data D2. Then, following the predetermined algorithm, pattern matching is implemented based on reference image data D1 and D2 so as to produce a connection image m30 of the original center, which is composited of the data of the first matching image to be joined m12 and the data of the second matching image to be joined m22.

Connection image m30 thus prepared is again transferred to auxiliary image processing board 500, where the image m30 is turned 270° so that its orientation coincides with that of the first image to be joined m11 and the second image to be joined m21, and then temporarily stored in memory 502.

Then, the data stored in memory 502 is loaded therefrom sequentially in the order of the data of the first image to be joined m11 and the data of connection image m30, and then the data of the second image to be joined m21, and is transferred to main image processing board 400, where the data is subjected to gamma correction and then is supplied to laser controller 404 so that LSU (laser scanning unit) 46 writes an image on electrophotographic photoreceptor 48. As a result, the scanned original can be reproduced as an integrated image ma of A3 size.

Alternatively, at first the data stored in memory 502, i.e., the data of the first image to be joined m11, connection image m30 and the second image to be joined m21 may be integrated so as to complete the data of the final image ma and store it. Then, upon image output, the complete data may be loaded sequentially from memory 502 and transferred to main image processing board 400, where the data is subjected to gamma correction and then is supplied to laser controller 404 so that LSU (laser scanning unit) 46 writes an image on electrophotographic photoreceptor 48. Resultantly, the scanned original can also be reproduced as an integrated image ma of A3 size. This algorithm, however, needs a large storage capacity of memory and requires extra processing time for data storage.

Heretofore, the image joining mode has been explained in which an original image is read part by part by multiple scans and the partial images are used to reproduce a reduced integrated image.

Next, a configuration which aims at further improvement of the operativity and functionality in this image joining mode will be explained.

There are various documents some are regular sized, others are irregular sized.

Figure 12:
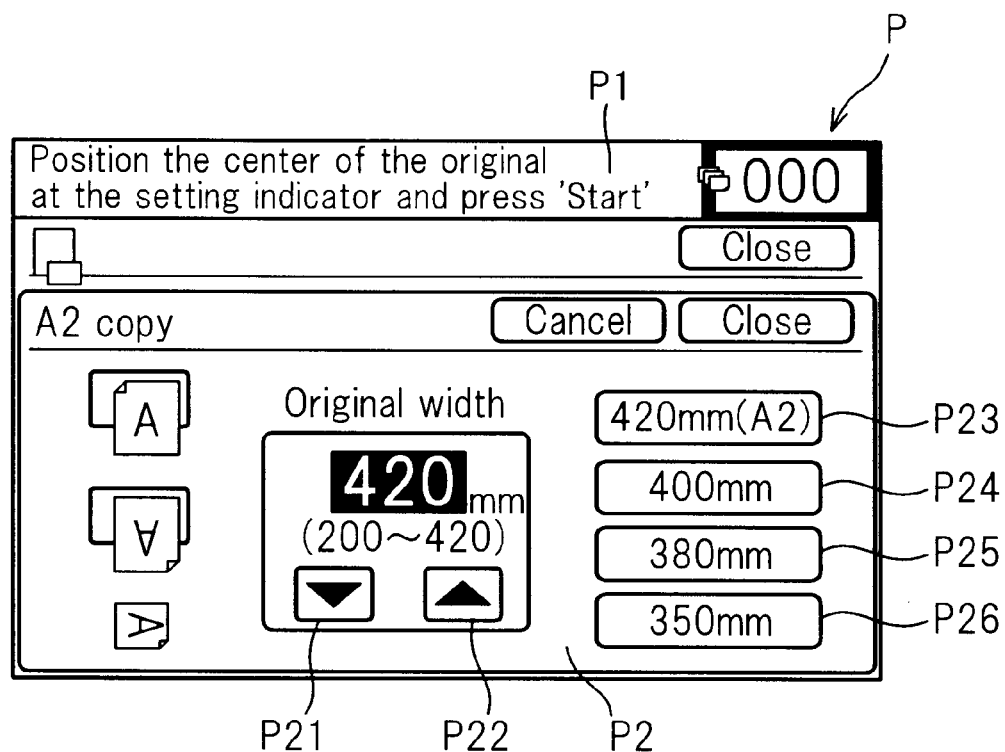
FIG. 12 is a plan view showing the control panel with a display for designating the width of an original to be set on the original table for the joining process.

When this original joining mode is selected, a display image P1 shown in FIG. 12 is displayed on the LCD dot-matrix display portion P in control panel OP so as to allow for the operator to input the original width.

Here, provided over the display frame of LCD dot-matrix display portion P is a transparent touch-panel tablet so as to be able to accept the input commands which are selected by the operator's touching desired keys in the key display portion P2 whilst viewing the display contents.

In this configuration, the original width presently selected is displayed in numeral in the approximately center of the display frame, with up-key P21 and down-key P22 disposed below for increasing or decreasing the setting in steps of the predetermined unit.

Displayed further on the right side of the display frame are four registration keys P23, P24, P25 and P26, for which frequently used original widths can be selected and stored beforehand so that the operator can directly input the original width with a simple touch.

When the original width has been selected through these keys P23 to P26 and then the print switch provided on the control panel OP is operated, the first partial image m1 of original m is scanned and thereafter, when the print switch is operated again after original m is turned upside down, the second partial image m2 of original m is scanned.

In this case, as to original image scanning unit 40 of image scanner portion 31 in digital copier 30, the scanning range of reading the original is determined in accordance with the input original width information and thereby the extraction range of the matching image to be used for the joining process of captured, target images to be joined can also be limited, so that the speed of the matching processing in image joining processing board 602 can be improved and hence the matching process can be completed in a shorter time.

On the other hand, even when an original is set on original table 35 with its width unknown, it is possible to easily determine the width of the original because scales 35d are provided on original size scale plate 35b. Further, a numeric value is displayed on the right side of each scale 35d so that the original set over original table will not hide the numeric value.

Accordingly, the operator can check scales 35d and determine the numerical value of a scale 35d close to which the edge of the original resides, and hence can easily set the original width by operating the touch panel of key display portion P2 in display frame P1 shown in FIG. 12.

Next, description will be made of a controlling method for rotating the first image to be joined m11 and the second image to be joined m21, that is, the alternation of the orientations of these images in accordance with the size and orientation of the sheet on which the joined image will be recorded.

In the above description, an example was discussed in which original scanning portion 31 captures the image of an A2 sized original and image output portion 32 records the image on an A3 sized sheet. However, the output can be produced on any size of paper as long as the paper can pass through digital copier 30. Therefore, it is necessary to contemplate a configuration in which the joined image can be reproduced on a sheet by varying the size of the reproduction in accordance with the selected sheet.

For example, the sheet sizes include, in addition to A3 size, B4, A4, B5 etc. Therefore, in the case where an A4 sized or B5 sized sheet is used, it is necessary to consider that the duplication may be performed with the sheet's orientation rotated 90° (in A4R and B5R modes).

In this embodiment, since an original at a maximum size of A3 may be set on the original table, the maximum size of an original to be handled by the image joining mode necessarily becomes A2, while the maximum size of the print paper which can pass through the image output portion 32 of digital copier 30 is A3. Therefore, the above embodiment is configured so that the first step of the image joining process will be implemented, at a zoom ratio of 70% when an A2 sized original is reproduced on an A3 sized printed sheet.

For further reduction, the joined image of A3 size is zoomed or adjusted in size so that the joined image will fit a selected size of sheet, thus making it possible to output the image on the selected size of sheet. More specifically, the joined image of A3 size is adjusted to a selected size of sheet, such as being reduced to 86% for B4, 70% for A4, 61% for B5.

As has been already referred to, there is a need to consider the size and orientation of the sheet on which a joined image is reproduced.

Figure 14:
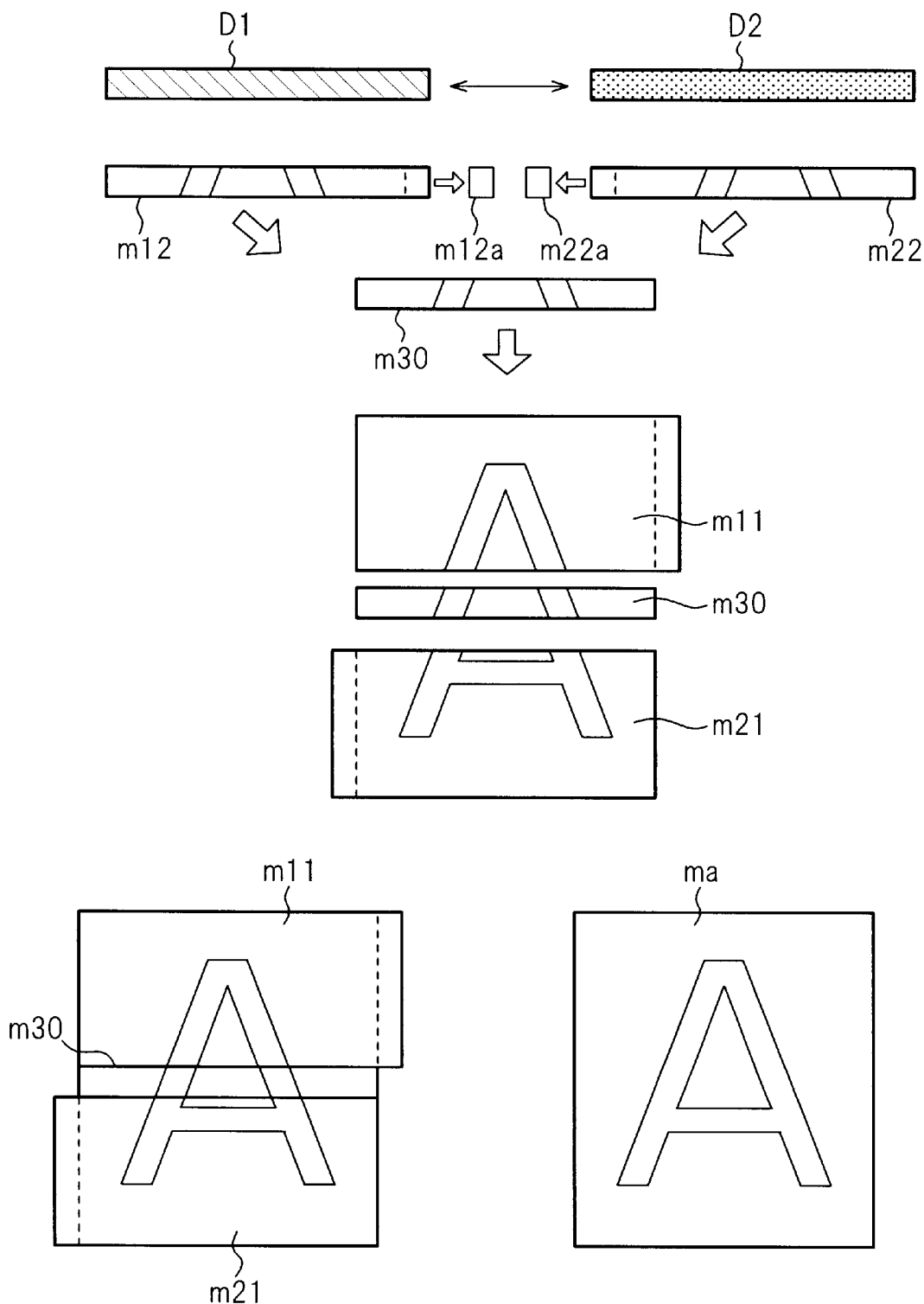
FIG. 14 is an illustrative diagram showing the state of reading an original when an A2-sized original image is reproduced in a joining manner as an image of A3 size in the second embodiment of the present invention, by considering the orientation of the joined, final image and the orientation of the paper.

Illustratively, if one from A3, B4, A4R and B5R was selected as the paper size for output, the original is processed based on the operation described above with reference to FIGS. 10A, 10B and 11, then the A3 sized joined image may be simply reduced by the respective ratio for B4, A4R and B5R paper. However, when the output print is of A4 or B5 format, the partial images of an original obtained part by part by multiple scans, specifically, the first image to be joined m11, the second image to be joined m12, the first matching image to be joined m21 and the second matching image to be joined m22, need to be rotated as required, as shown in FIGS. 13A, 13B and 14. Then, after pattern matching, a single A3 image is reproduced, which, in turn, is shaped into the image of A4 or B5 format.

In the above case, as shown in FIGS. 10A, 10B and 11, first an integrated A3 image is reproduced after matching, then the image may be reduced to A4 or B5 size whilst it is rotated 90°, to thereby achieve recording onto the sheet.

In the above described embodiment, an example was described in which range mark 35c has a reference indicator 35e in the center thereof, but reference indicator 35e does not need to be positioned necessarily in the center and may be located at other positions as long as it is provided within range mark 35c. Further, sub-indicators other than reference indicator 35e may be provided within the range mark. Thus, the present invention will not be limited to the above embodied modes.

As has been described in accordance with the first and second aspects of the present invention, an original greater than the size the original table can handle is divided into parts and the thus divided parts of the original are scanned in a manner that produces at least an overlapping area between adjoining partial images. The image data containing the overlap area between partial images is converted into reduced partial images of data in correspondence with the size of duplication. These reduced partial images of data are used to implement pattern matching so as to composite separated, reduced partial images of the original into an integrated, duplicated image. Therefore, it is possible to markedly reduce the storage capacity required for the storage means. Further, since, instead of performing composition of partial images in the storage means, the composted image is formed directly on the recording medium such as paper etc., in accordance with sequential, partial images of data, it is possible to remarkably shorten the processing time of image data, compared to the conventional configuration in which partial images are first synthesized in the storage means and the synthesized image data is loaded therefrom. Further, since this configuration eliminates the necessity of a high capacity storage means for image composition, the apparatus' cost can be sharply reduced.

In accordance with the third aspect of the present invention, the reference plate located at the reference position on the original table is provided with a range mark displaying the joining area for matching and a reference indicator within this range mark. Therefore, when the image of an original is read, part by part, by multiple scans, it is possible to reliably capture the overlap area of the image, which corresponds to the joining portion of the original and hence is required for pattern matching. As a result, it is possible to easily deal with various types of originals including originals of an irregular size and shape. Further, the pre-process for detecting the position of the original image area is no longer necessary, so that it is possible to sharply increase the speed of the imaging process.

In accordance with the fourth aspect of the present invention, a pair of marks added at the opposing positions on both sides of the original or a fold of the original, can be set in alignment with the reference indicator provided within the range mark displaying the pattern matching area, so that it is possible to more reliably capture the image of the area required for joining the partial images of the original. Moreover, when, in a configuration where the reference indicator is provided at the center of the range mark, the original is set so that a pair of marks added at the opposing positions on both sides of the original, or a fold of the original is in alignment with the reference indicator, it is possible to reliably capture the partial images whilst suppressing the area required for image joining to the minimum. As a result, it is possible to further reduce the processing time and the processing accuracy.

Finally, in accordance with the fifth through seventh aspects of the present invention, when pressing members for fixing the original onto the original table are provided so as to prevent unintentional rotation or other movement of the original, it is possible to further efficiently effect the image forming operation in the image joining mode, without needing any correcting treatments required stemming from the rotation of the image.

What is claimed is:

1. An image forming method for duplicating an original image having a size greater than the maximum size to be placed on the original table, comprising the steps of:
   dividing the original image into a multiple number of partial images having a size equal to or smaller than the maximum placement size;
   scanning adjoining partial images in a partially overlapped manner to supply multiple sets of partial images of data;
   converting the, supplied, multiple partial images of data into reduced, partial images of data by reduction at a desired ratio;
   storing the converted, reduced partial images of data into multiple reduced partial image storage areas;
   effecting pattern matching by comparing adjoining reduced partial images of data as to the overlapping image data and determining a matching line to be associated with a storage area of the multiple reduced partial image storage areas;
   setting a joining position address in another storage area of the multiple reduced partial image storage areas that corresponds to the joining position in each storage area of reduced image data, based on the matching line; and
   reproducing a reduced image of the original on the predetermined recording medium in accordance with the reduced partial images of data sequentially output directly from the reduced partial image storage area based on the address of the matching line and the another reduced partial image storage area based on the joining position address in a joining manner.

2. The image forming method of claim 1, wherein
   said step of outputting the multiple reduced images is composed of outputting a first partial image of the multiple images ending at the address of a matching line, followed by outputting a second partial image of the multiple images starting at the corresponding joining position address; and wherein
   said step of reproducing is composed of reproducing the first partial image followed by reproducing the second partial image, sequentially on the predetermined recording medium.

3. An image forming apparatus for duplicating an original image having a size greater than the maximum size to be placed on the original, comprising:
   an original image scanning means which successively scans a multiple number of partial images of an original, each divided to a size equal to or smaller than the maximum size of the original table, in a manner that produces at least an overlapping area between adjoining partial images, and supplies the multiple partial images of data;
   an image reducing means converting the multiple partial images of data supplied from the original image scanning means into reduced partial images of data, reduced at a desired ratio;
   a plurality of reduced partial image data storing means for storing each reduced partial image of data produced by the image reducing means;
   a pattern matching means for implementing pattern matching based on the overlap image data between the adjoining, reduced partial images of data and determining a matching line to be associated with a reduced partial image data storing means of the plurality of reduced partial image data storing means;
   an address setting means for setting a joining position address in another reduced partial image data storing means of the plurality of reduced partial image data storing means that corresponds to the joining position in each storage area of reduced image data, based on the matching line;
   a data output control means which, based on the address of the matching line and the joining position address, controlling output of the multiple reduced partial images of data stored in said respective reduced partial image data storing means and another reduced partial image data storing means, in a sequentially, joinable manner; and
   an image forming means for forming a reduced image of the original on a predetermined recording medium in accordance with the image data output directly from the respective reduced partial image data storing means based on the address of the matching line and said another reduced partial image data storing means based on the joining position address.

4. The image forming apparatus according to claim 3, further comprising an original pressing member for fixing the original onto the original table.

5. The image forming apparatus of claim 3, wherein said data output control means outputs a first partial image of the multiple reduced partial images ending at the address of a matching line, then sequentially outputs a second partial image of the multiple reduced partial images starting at the corresponding joining position address; and wherein said image forming means reproduces the first partial image then sequentially reproduces the second partial image, on the predetermined recording medium.

6. An image forming apparatus for duplicating an original image having a size greater than the maximum size to be placed on the original table, comprising:

a reference plate disposed so as to extend in one direction over the original table and having a side edge which forms the datum for the placement of an original;

an original image scanning means for capturing the image of an original placed abutting against the side edge of the reference plate, part by part, by multiple scans, to produce and supply multiple partial images of data containing an overlapping area between adjoining partial images;

a connection relationship determining means for determining the connection relationship between adjoining multiple partial images of data of the original, based on the image data of the original image, within the joining range which extends perpendicularly to the reference plate with a predetermined width, by determining a matching line to be associated with a partial image of the multiple partial images and setting a joining position address in another partial image based on the matching line;

a data output control means for adjoining the partial image based on the address of the matching line and the another partial image based on the joining position address; and an image forming means for forming an image of the original on a predetermined image medium, according to image data sequentially output directly from the partial image based on the address of the matching line and the another partial image based on the joining position address, wherein the reference plate has a range mark displaying the joining area and a reference indicator within the range mark.

7. The image forming apparatus according to claim 6, wherein the reference indicator is located at the center of the range mark with respect to the extended direction of the reference plate.

8. The image forming apparatus according to claim 7, further comprising an original pressing member for fixing the original onto the original table.

9. The image forming apparatus according to claim 6, further comprising an original pressing member for fixing the original onto the original table.

* * * * *